April 30, 1957 R. W. POWELL 2,790,760
NEUTRONIC REACTOR
Filed Aug. 10, 1954 5 Sheets-Sheet 4

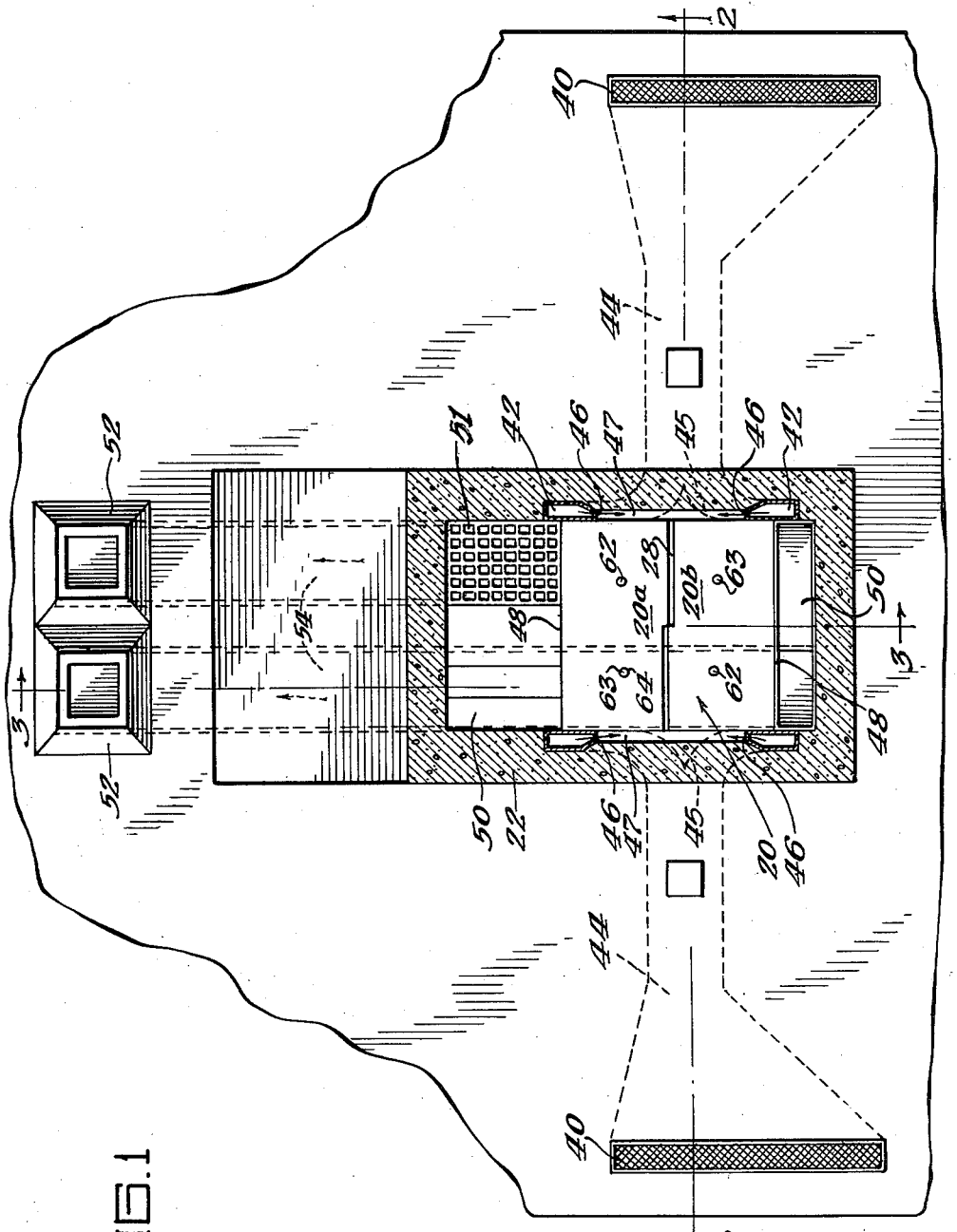

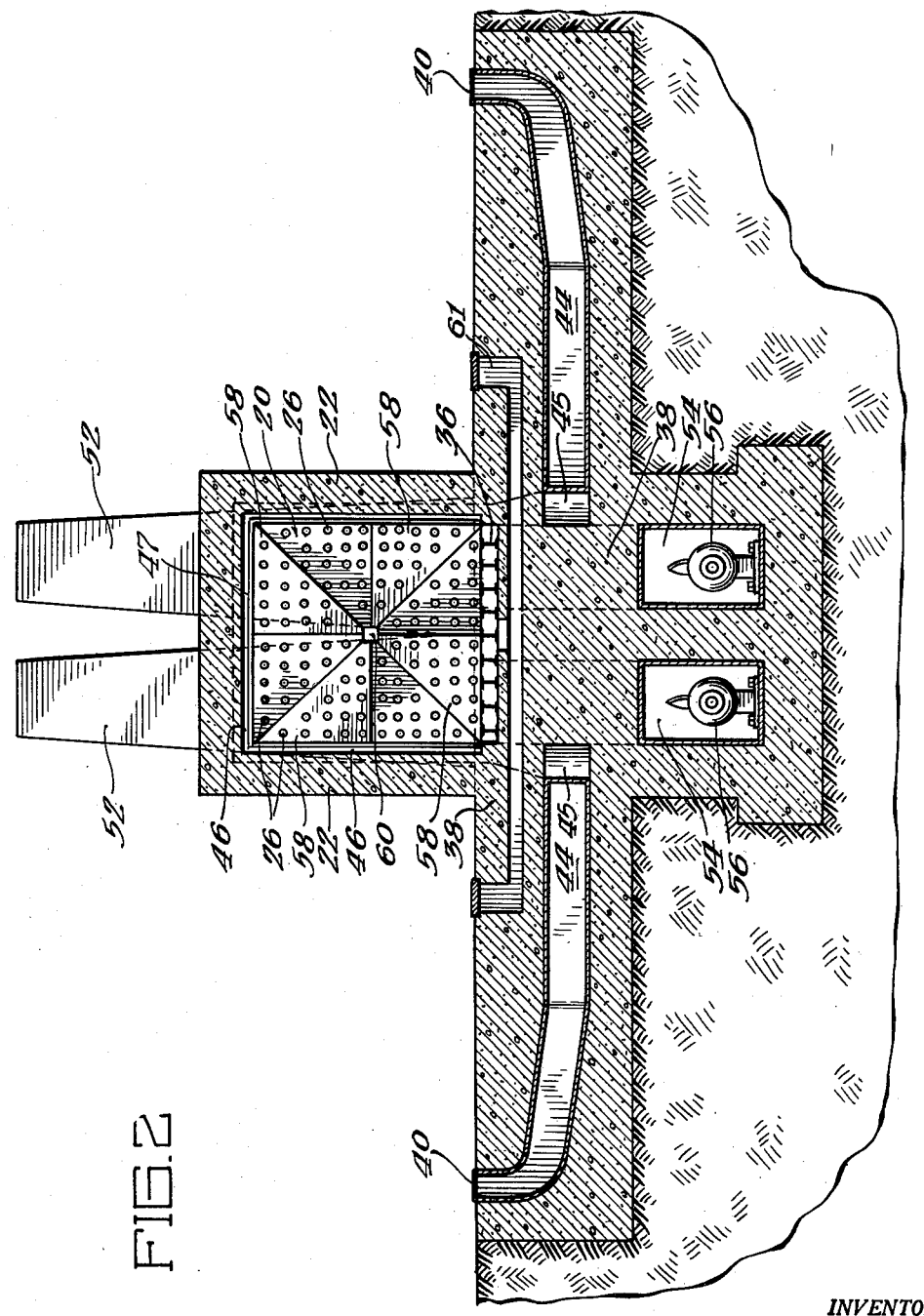

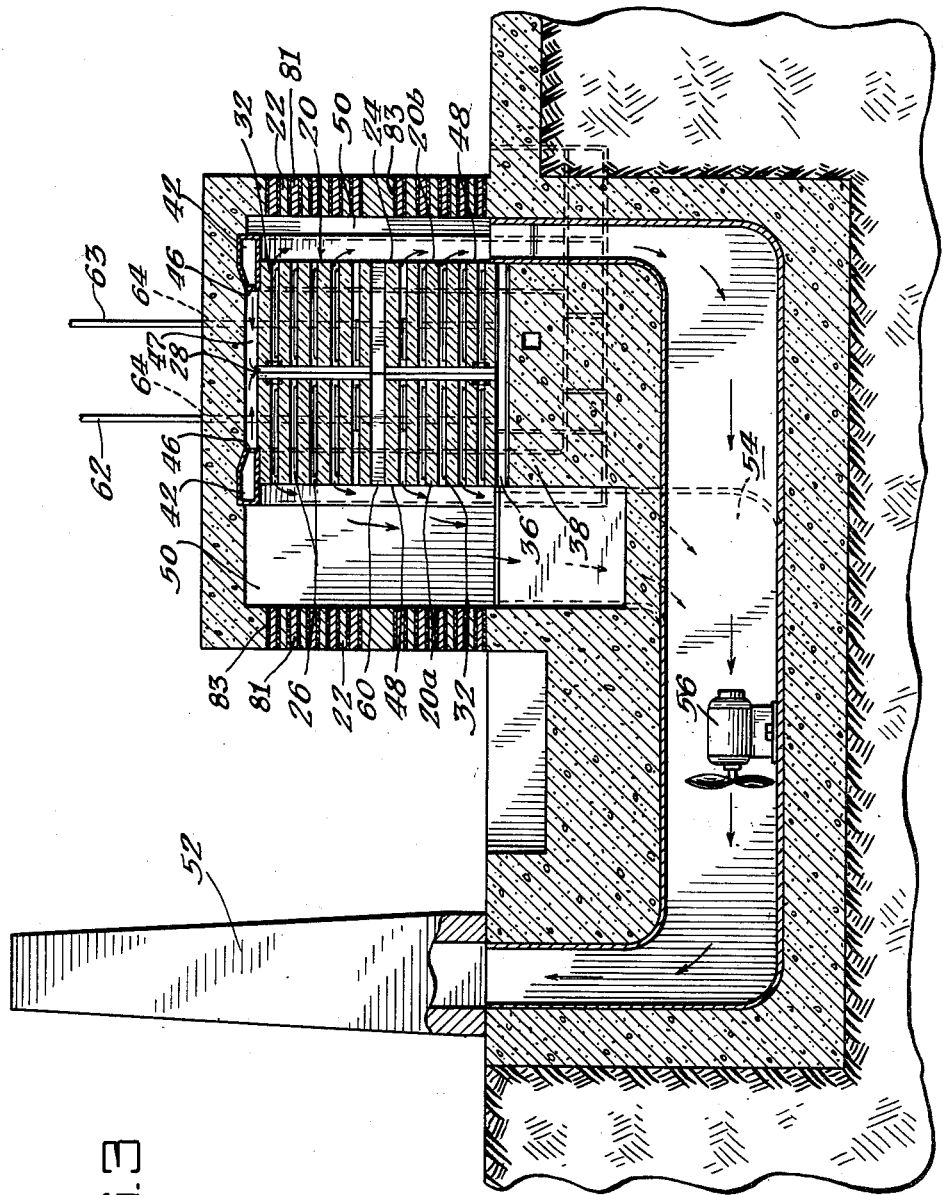

INVENTOR.
Robert W. Powell
BY
Roland A. Anderson
Attorney

INVENTOR.
Robert W. Powell
BY
Roland A. Anderson
Attorney

# United States Patent Office 2,790,760
Patented Apr. 30, 1957

2,790,760
NEUTRONIC REACTOR

Robert W. Powell, Sayville, N. Y., assignor to the United States of America as represented by the United States Atomic Energy Commission Application August 10, 1954, Serial No. 449,031

9 Claims. (Cl. 204—193)

The present invention relates generally to neutronic reactors, and specifically to fluid cooled neutronic reactors.

The neutronic reaction occurring when a neutron strikes an atom of fissionable material and separates the atom by the process called fission liberates a large quantity of energy which partly appears in the form of heat. The heat liberated by the fission process may be used as the medium for conveying the energy of fission to devices for accomplishing work, or it may merely be considered an undesirable product which must be removed in order to prevent deterioration of the structure of a neutronic reactor. In either event, a means must be provided to cool a neutronic reactor, especially if the power level of the reactor is significant.

Many neutronic reactors have been devised using different types of cooling mechanisms. In general, it has been found that the coolant must be forced through the reactor under pressure in order to remove from the reactor a sufficient quantity of heat to maintain the temperature of the reactor structure within permissible limits. Various coolant mediums have been employed for this purpose. It is necessary, however, that the coolant medium have satisfactory nuclear properties, as well as the usual desirable thermal properties, since the coolant will be disposed within the region in which the neutron chain reaction is occurring. Generally, the most important nuclear property which must be possessed by a coolant medium is that it must have a relatively low neutron capture cross section. It is also very desirable that the coolant medium be stable in the presence of nuclear and radiation bombardment. Suitable coolants, and the desirable properties for reactor coolants are discussed in the patent application of Enrico Fermi and Leo Szilard, Serial No. 568,904, filed December 19, 1944, now Patent No. 2,708,656.

One of the most easily obtained coolant mediums is air, and many neutronic reactors have been designed and constructed using air as a coolant medium. The patent application of Eugene P. Wigner and Charles C. Creutz, Serial No. 293,104, filed June 12, 1952, discloses an air cooled neutronic reactor in which the air is introduced into a central gap in the active portion of the reactor and flows through the reactor from the gap. The present application is a continuation-in-part of application Serial No. 287,822, filed May 15, 1952, entitled "A Neutronic Reactor," now abandoned.

Such a gap located centrally traversing the active portion of the reactor increases the critical size of the neutronic reactor and lowers the multiplication factor for the reactor. The multiplication factor is the ratio of the number of neutrons of one generation within a reactor of infinite size to the number of neutrons of the preceding generation. For this reason, the present invention is directed to a neutronic reactor having a central gap through the active portion thereof which minimizes the loss in the multiplication factor of the neutronic reactor without losing the advantages gained by introducing the fluid coolant into a central gap in the active portion of the reactor.

The present invention may clearly be practiced with any type of fluid cooled reactor, but for simplicity, the drawings illustrate the invention in the form of an air cooled neutronic reactor. In the drawings:

Figure 1 is a plan view of an air cooled neutronic reactor, partially in section;

Figure 2 is a vertical sectional view of the reactor taken along line 2—2 of Figure 1;

Figure 3 is a sectional view of the reactor taken along line 3—3 of Figure 1;

Figure 5:
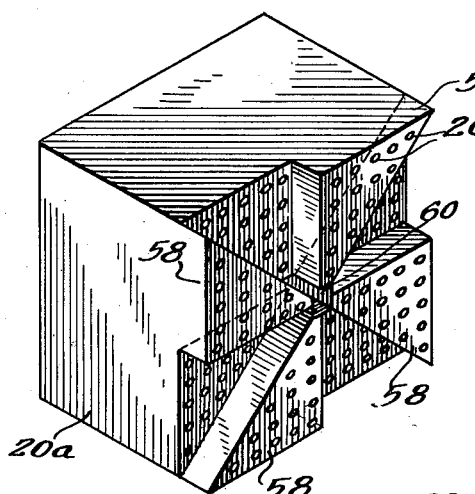
Figure 5 is an isometric view of one of the two portions of the active portion of the neutronic reactor.
Figure 8:
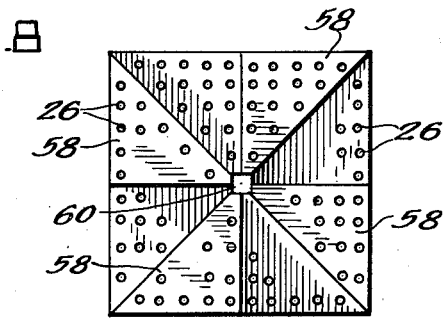
Figure 8 is a sectional view of the active portion of the neutronic reactor taken along line 8—8 of Figure 7.
Figure 7:
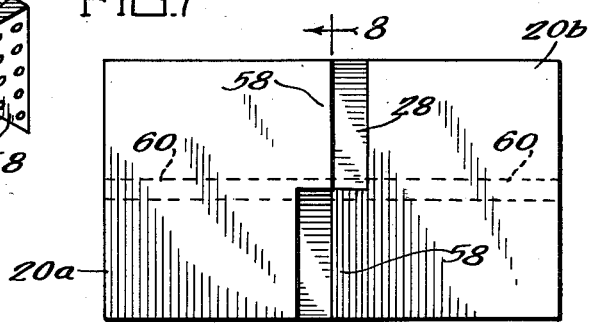
Figure 7 is a side elevational view of the entire active portion of the neutronic reactor shown isometrically in Figure 4.
Figure 6:
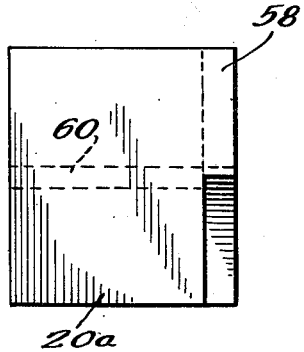
Figure 6 is a side elevational view of the portion of the active portion of the neutronic reactor shown isometrically in Figure 5.
Figure 4:
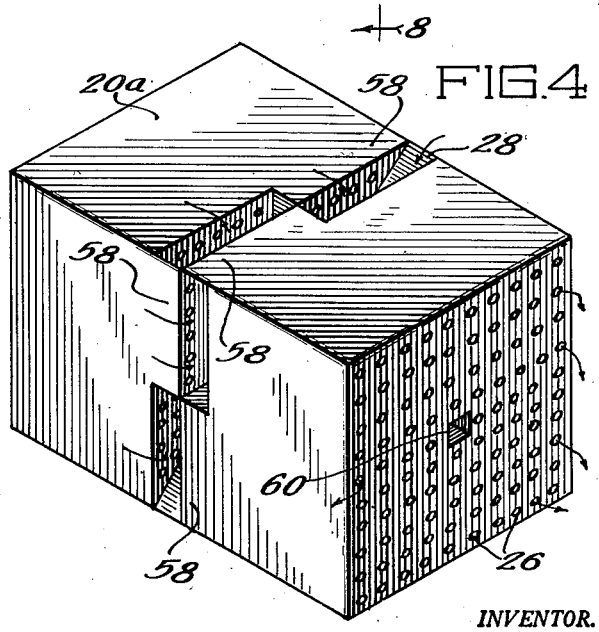
Figure 4 is an isometric view of the active portion of the neutron reactor shown in Figures 1 through 3.
Figure 9:
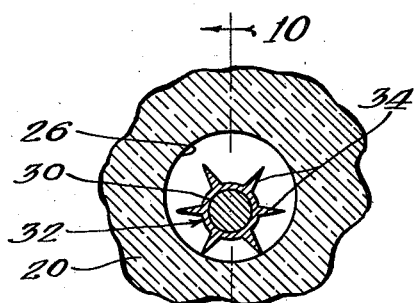
Figure 9 is an enlarged fragmentary view of a portion of the reactor showing one of the coolant channels of the reactor.
Figure 10:
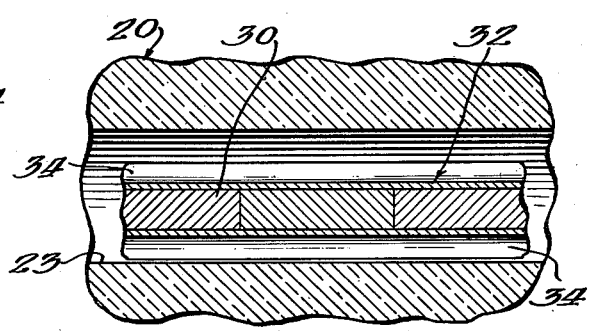
Figure 10 is an enlarged fragmentary view of a portion of the reactor taken along line 10—10 of Figure 9.

The neutronic reactor shown in Figures 1 through 10 has an active portion 20 surrounded by a shield 22. The shield may be constructed in the manner known to the art, any relatively dense material containing hydrogen, such as concrete, having been found to be satisfactory. The active portion 20 of the reactor includes a moderator 24 provided with coolant channels 26. The active portion 20 is divided into two equal portions 20a and 20b by a gap 28 which traverses the center of the active portion 20 of the reactor.

The moderator may be constructed of a number of suitable materials, one particularly suitable material being graphite. In general, a suitable moderator material for a reactor using natural uranium is one having a "moderating ratio" greater than that of water, the term "moderating ratio" being defined by the expression $$\frac{\sigma_s \xi}{\sigma_c}$$

where $\sigma_s$ is the neutron scattering cross section of the moderating material, $\sigma_c$ is the neutron capture cross section for the material, and $\xi$ is the mean logarithmic energy loss for neutron collision with an atom of the material.

The thermal neutron fissionable material used in the reactor is in the form of bodies 30 of uranium which are disposed within containers 32. The containers 32 are provided with fins 34 and rest within the coolant channels 26. The containers 32 may be secured within the coolant channels 26 by conventional means if the force exerted upon the containers 32 by the fluid coolant is excessive. The container 32 may be constructed of aluminum, or other material having suitable mechanical properties and a small neutron capture cross section.

The entire active portion 20 of the reactor is supported upon a series of spaced I beams 36 which are in turn mounted upon a concrete base 38. The I beams 36 are disposed normal to the gap 28 through the active portion 20 of the reactor.

Air intake filters 40 are disposed upon opposite sides of the reactor for the purpose of introducing the air coolant into the coolant system of the reactor. Adjacent to the end of each of the portions 20a and 20b of the active portion 20 of the reactor is disposed a manifold 42 which girdles the active portion 20 of the reactor. The manifolds 42 are generally U-shaped and connected to the intake filters 40 by means of air ducts 44 and T-connections 45. The manifolds 42 are provided with a plurality of apertures 46 adjacent to the surfaces of the active portion 20 of the reactor which communicates with the gap 28 through a passageway 47 between the active portion 20 and shield 22, but are sealed from the other surfaces of the reactor, namely exhaust faces 48 disposed at opposite ends of the active portion 20. In this manner means are provided defining a passageway between the apertured surface of each of the manifolds and the gap which includes a surface of the active portion.

It is thus clear, that the air coolant flows through the filters 40, through the ducts 44 to the manifolds 42, thence across the sides of the active portion 20 of the reactor, into the gap 28, and through the coolant channels 26 in the active portion 20 of the reactor. Adjacent to the exhaust faces 48 of the active portion 20 of the reactor are plenum chambers 50 which are connected to stacks 52 by means of ducts 54 in order to exhaust the coolant air from the reactor. As illustrated in Figure 1, a grating 51 is disposed at the inlet end of the exhaust duct 54 leading between the stack 52 and the chamber 50 adjacent to the portion 20a of the active portion of the reactor. Exhaust fans 56 are disposed within the exhaust ducts 54 in order to provide energy to circulate the air coolant throughout the reactor.

Figure 11:
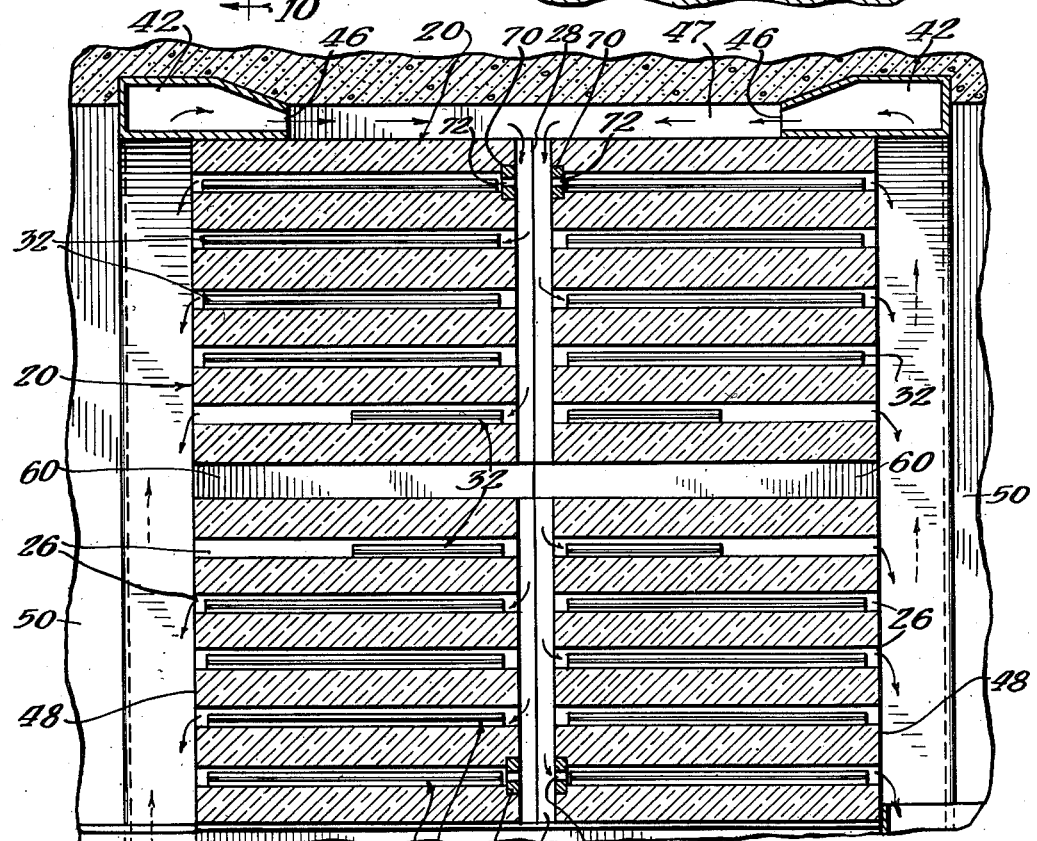
Figure 11 is an enlarged fragmentary sectional view of the active portion of a reactor similar to the reactor described in Figures 1 through 10 ilustrating modifications of the reactor.

It is desirable to regulate the flow of coolant air through the different channels in the active portion 20 of the reactor, because the heat generated in the central portion of the active portion 20 is much greater than the heat generated in the peripheral portions thereof. Generally, it is desirable to operate each of the fuel containers 32 with a maximum permissible surface temperature. If the flow of coolant is just sufficient to properly cool the fuel containers 32 in the peripheral portions of the reactor, the temperature of the containers in the central portion of the active portion 20 of the reactor will exceed the maximum permissible temperaute. However, the length of the fuel containers 32 in the central channels 26 of the active portion 20 may be decreased, thereby leaving a portion of the channels 26 near the center of the reactor without fuel containers 32, thus increasing the size of the channel 26 available for transporting the coolant air. This modification of the reactor is shown in Figure 11. This construction however reduces the neutron reproduction ratio of the reactor, and may not be practical if this ratio is not substantially above unity. The neutron reproduction ratio of a reactor is the ratio of the number of neutrons in successive generations in a reactor of finite size.

Another construction which may be used to obtain a more uniform surface temperature for the fuel containers 32 throughout the entire reactor restricts the flow of air in the peripheral channels of the reactor. This may be done in stages, the central channels 26 of the active portion 20 being unrestricted, the adjacent channels slightly restricted, and the peripheral channels still more restricted. Figure 11 also illustrates this construction, the drawing only illustrating restriction in the top and bottom channels 26 of the active portion 20. The restrictions are formed by securing plugs 70 provided with relatively small apertures 72 in the ends of the channels 26 adjacent to the gap 28.

Any gap through the center of the active portion 20 of a reactor reduces the excess reactivity of the reactor, since a neutron entering into the gap at a slight angle to the surfaces thereof enters into a less dense medium and is more apt to escape from the active portion of the reactor. The present invention reduces the possibility of such a neutron escaping. Each half 20a and 20b of the active portion 20 of the reactor is provided with four spaced prismatic protruding sections 58 on the surface adjacent to the gap 28. Each of these prismatic sections 58 is constructed of the same materials and in the same manner as the remainder of the active portion 20 of the reactor and utilizes moderator material with channels 26 disposed therein. Fissionable bodies 30 are also disposed within the channels 26 in the prismatic sections 58, and other neutron absorbing materials are maintained at a minimum, just as in the case of the remainder of the active portion 20. Each of the prismatic sections 58 has a vertex on a line traversing the center of the reactor and an included angle of approximately 45 degrees. The prismatic sections 58 on the two halves of the active portions 20a and 20b are displaced by 45 degrees, thereby providing a gap 28 with eight portions, two on each surface of the active portion 20 of the reactor. The width of each portion of the gap is equal to the protuberance of each of the prismatic sections 58, and the two portions of the gap on each surface of the active portion 20 of the reactor are disposed on opposite sides of the center of the active portion 20 of the reactor.

A rectangular duct 60 extends through the center of the active portion 20 of the reactor normal to the gap 28, and has been provided in order to permit the irradiation of objects within the active portion 20 of the reactor. A rectangular duct 61 has also been provided beneath the active portion 20 of the reactor normal to the duct 60 for the same purpose.

The neutronic reactor has been provided with excess reactivity in order to make the reactor suitable for irradiating non-fissionable objects therein. However, the excess reactivity must be dissipated in order to prevent the reactor from developing an explosive neutronic chain reaction. For this reason, control rods 62 are slidably disposed within channels 64 which extend into the active portion 20 of the reactor. The control rods 62 are constructed of material having a neutron capture cross section of at least 100 barns, so that they will absorb appreciable numbers of neutrons in order to maintain the neutron reproduction ratio at unity, and when fully inserted, reduce the ratio below unity to stop the neutronic chain reaction.

In one embodiment of the present invention, the active portion 20 of the reactor is constructed of two equal sized parallelepipeds which together form a cube 25 feet long on a side. There are a total of 1369 coolant channels 26 disposed in a rectangular lattice, each channel being spaced from the nearest adjacent channels by a distance of 8 inches. The area of the coolant channels 26 is 5.6 square inches, and the diameter of the natural uranium fissionable bodies 30 within the channels is 1.1 inches. The uranium used in the bodies 30 is carefully refined to remove impurities having large neutron capture cross sections. Such elements as boron, cadmium, indium and some of the rare earths have been reduced to less than $10^{-6}$ grams per gram of uranium. The containers 32 and fins 34 are constructed of aluminum, the total volume of aluminum to the volume of uranium being 0.2. The 1,089 channels surrounding the axis of the active portion 20 are filled with uranium fuel bodies 30, as described above, and the active portion 20 contains a total of 93.5 tons of uranium. The gap 28 between the two portions 20a and 20b of the active portion of the reactor measures 2.75 inches, and is divided into 8 sections as a result of the protruding prismatic sections 58, described above.

The neutronic reactor operates with a maximum temperature of the uranium bodies 30 of 350° C., the exit air being approximately 200° C. Approximately 270,000 cubic feet of air per minute flows through 1,089 channels 26 of the active portion 20 of the reactor permitting a neutron flux of 4×10¹² neutrons per square centimeter second, which corresponds to a power output of approximately 28,000 kilowatts. Those coolant channels 26 which do not contain bodies of fissionable material are blocked at their inlet ends to prevent the flow of coolant from being diverted through these channels 26. 5,600 kilowatts of power are used to pump the air through the reactor, and a pressure drop of 103 mm. of Hg occurs in the reactor cooling system.

Two types of graphite are used in the reactor. The central core of the active portion of the reactor is constructed of the first type of graphite, a cube of approximately 18.5 feet on a side being of this material. The diffusion length for thermal neutrons of the first type of graphite, i. e., the most probable length a thermal neutron will travel in the medium before being absorbed, has been found to be 52 centimeters. The remainder of the reactor is constructed of the second type of graphite with a diffusion length averaging 48 centimeters.

The reactor is provided with 16 control rods 62 which are equally spaced throughout the active portion 20 of the reactor and may be inserted into the active portion 20 of the reactor. These control rods 62 are able to reduce the neutron reproduction ratio by about 0.035. Each rod 62 is constructed of 1.75 percent boron steel and has a square cross section of 4 square inches. In addition, there are 14 safety rods 63 which are of similar construction which may be inserted into the active portion of the reactor in order to prevent a reaction from becoming uncontrollable, however, these safety rods 63 are generally maintained exterior to the reactor.

The fuel bodies 30 may be inserted into the channels 26 in the reactor by removing shielding plugs 81 which are inserted in sleeves 83. After the fuel bodies 30 have been withdrawn or placed within the active portion 20 of the reactor, the shielding plugs 81 are reinserted into the sleeve 83, and the reactor is ready to resume operation.

It may readily be seen, that the gap 28 disposed through the center of the active portion 20 of the reactor is staggered, so that the probability of a neutron entering into the gap 28 at a small angle to the surface thereof striking a more dense medium before it escapes from the active portion 20 of the reactor is increased. It is clear, that the permissible angular direction of the entering neutron which can escape has been restricted from 360° to only approximately 45°. In this manner, the present invention greatly reduces the loss of neutrons through the gap 28 in the reactor without impairing the desirable cooling features which the reactor has as a result of the gap 28. It is also to be noted that the prismatic portions 58 in effect provide a plurality of inlets for the coolant air entering through the gap 28. As a result of this fact, turbulence of the incoming air is reduced.

The man skilled in the art will readily devise many other reactors within the scope of the present invention. It is clear, for example, that any fluid cooled reactor may practice the concepts of the present invention. For this reason, it is intended that the scope of the present invention be limited only by the following claims, and not by the specific disclosure.

What is claimed is:

1. A neutronic reactor comprising, in combination, an active portion having a moderator and material fissionable by neutrons of thermal energy, said active portion being divided into two sections by a gap traversing the center of the reactor, the confronting surfaces of said sections having a plurality of prismatic protruding portions spaced by recessed prismatic portions, the recessed and protruding portions having vertices on a common axis traversing the center of the active portion of the reactor, the protruding portions on one surface confronting the recessed portions on the other surface, means defining a plurality of parallel channels extending from the gap through each section of the active portion, and means for flowing a fluid coolant into the gap, whereby the fluid coolant divides and flows outwardly from the gap through the channels of each section.

2. A neutronic reactor comprising, in combination, a pair of graphite blocks confronting each other and spaced by a gap, each of said blocks being provided with a plurality of parallel channels extending from the gap therethrough, bodies of uranium disposed within the channels, the confronting surfaces of said blocks having a plurality of protruding portions spaced by recessed portions, the protruding portions on one surface confronting the recessed portions on the other surface, and means for flowing a fluid coolant into the gap between the graphite blocks, whereby the fluid coolant divides and flows from the gap through the parallel channels in each block.

3. A neutronic reactor comprising, in combination, an active portion having a graphite moderator provided with a plurality of parallel channels extending therethrough and bodies of uranium disposed within the channels, said active portion being divided into two sections by a gap traversing the center of the active portion of the reactor in a plane normal to the channels, the confronting surfaces of said sections having a plurality of prismatic protruding portions spaced by recessed prismatic portions, the recessed and protruding portions having vertices on a common axis traversing the center of the active portion of the reactor, the protruding portions on one surface confronting the recessed portions on the other surface, and means to flow a fluid coolant into the gap, whereby the fluid coolant divides and flows outwardly from the gap through the channels in the two sections of the active portion of the reactor.

4. A neutronic reactor comprising the elements of claim 3 wherein the protruding portions and recessed portions on the confronting surfaces of each of the sections form an included angle at their vertices of approximately 45°.

5. A neutronic reactor comprising, in combination, an active portion having a moderator provided with a plurality of parallel channels extending therethrough and material fissionable by neutrons of thermal energy disposed within the channels, said active portion being divided into two sections by a gap traversing the active portion in a plane normal to the channels, the confronting surfaces of said sections having a plurality of prismatic protruding portions spaced by recessed prismatic portions, the protruding portions on one surface confronting the recessed portions on the other surface, and means to cool the reactor including means to introduce a fluid coolant into the gap between the sections of the active portion of the reactor, whereby the fluid coolant divides and flows outwardly through the channels in the two sections of the active portion.

6. A neutronic reactor comprising, in combination, an active portion having a graphite moderator provided with a plurality of parallel channels extending therethrough and bodies of uranium disposed within the channels, said active portion being divided into two sections by a gap traversing the center of the active portion of the reactor in a plane normal to the channels, the confronting surfaces of said sections having a plurality of prismatic protruding portions spaced by recessed prismatic portions, the recessed and protruding portions having vertices on a common axis traversing the center of the active portion of the reactor, and the protruding portions on one surface confronting the recessed portions on the other surface, and means to circulate a fluid coolant through the channels of the reactor, said means including means to introduce the fluid coolant into the gap between the sections of the reactor, whereby the fluid coolant divides and flows outwardly through the channels in the two sections of the active portion.

7. A neutronic reactor comprising, in combination, an active portion having a graphite moderator provided with a plurality of parallel channels extending therethrough and bodies of uranium disposed within the channels, said active portion being divided into two sections by a gap traversing the center of the active portion of the reactor in a plane normal to the channels, the confronting surfaces of said sections having prismatic protruding portions spaced by recessed prismatic portions, the recessed and protruding portions having vertices on a common axis traversing the center of the active portion of the reactor, said portions forming an included angle about their vertices of approximately 45°, and the protruding portions on one surface confronting the recessed portions on the other surface, and means to circulate air through the channels in the active portion of the reactor, said means including means to introduce the air into the gap between the sections of the active portion of the reactor.

8. A neutronic reactor comprising, in combination, an active portion having a pair of equally dimensioned rectangular graphite blocks confronting each other and forming a cube, said blocks being separated by a gap of approximately 2.75 centimeters and being provided with a plurality of annular channels approximately 5.6 square inches in cross section extending from the gap through each of the graphite blocks, the channels within the reactor being spaced by approximately 8 inches in a rectangular lattice, the graphite blocks together forming a cube of approximately 25 feet on a side, a plurality of cylinders consisting of uranium with an isotopic content essentially equal to that found in nature having a diameter of 1.1 inches disposed within the channels, jackets of aluminum disposed about the cylinders, the ratio of the volume of aluminum to the volume of uranium in the active portion of the reactor being approximately 0.2, the active portion of the reactor containing 1,089 uranium containing channels with a total of 93.5 tons of uranium disposed within the active portion, the confronting surfaces of the two portions of the active portion having prismatic protruding portions spaced by a recessed prismatic portion, the recessed and protruding portions having vertices on a common axis traversing the center of the active portion of the reactor, said portions forming an included angle about their vertices of approximately 45°, the protruding portions on one surface confronting the recessed portions on the other surface, and means to circulate air through the channels in the active portion of the reactor including means to introduce the air into the gap between the sections of the active portion of the reactor.

9. A neutronic reactor comprising the elements of claim 8 in combination with means defining a pair of plenum chambers adjacent to opposite sides of the active portion of the reactor, the channels within the active portion communicating with said plenum chambers, a manifold sealed to each of the sections of the active portion adjacent to the plenum chambers having apertures confronting the gap in the active portion, means defining a passageway including a surface of the active portion between the apertured surface of each of the manifolds and the gap, and the means to circulate air through the channels in the active portion having means to introduce air into the manifolds.

References Cited in the file of this patent

UNITED STATES PATENTS 2,708,656     Fermi et al. _____ May 17, 1955

OTHER REFERENCES

Atomics, vol. 5, No. 4 (April 1954).

U. S. Atomic Energy Commission, BNL–152; January 1952; I. Kaplan and J. Chernick; pp. 6–8, 37–42, 45–49.